United States Patent Office 3,101,375
Patented Aug. 20, 1963

3,101,375
PRODUCTION OF UNSATURATED KETONES
Henry Peter Crocker, Hornsea, England, assignor to The Distillers Company Limited, Edinburgh, Scotland, a British company
No Drawing. Filed July 14, 1960, Ser. No. 42,754
Claims priority, application Great Britain Aug. 21, 1959
2 Claims. (Cl. 260—595)

The present invention relates to the production of organic compounds and in particular to the production of unsaturated ketones.

The present invention is a process of producing an unsaturated ketone having the formula

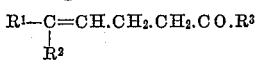

which comprises heating an allyl acetoacetate having the formula

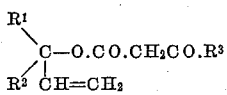

in contact with an aluminium compound having the formula

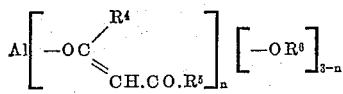

wherein $R^1$ and $R^2$ are alkyl groups of 1 to 2 carbon atoms or hydrogen atoms, $R_3$ is an alkyl group of 1 to 2 carbon atoms and $R^6$ is an alkyl group of not more than 5 carbon atoms, $R^4$ and $R^5$ are alkyl or alkoxy groups of 1 to 2 carbon atoms, and $n$ is one of the integers 1 or 2. Where more than one of any of the groups $R^4$, $R^5$ or $R^6$ is present in the formula of the aluminium compound, they may be the same or different groups.

The allyl acetoacetate may be heated in contact with the aluminium compound with advantage at an elevated temperature, preferably at a temperature from 100° to 250° C. The temperature used in any particular embodiment of the invention depends on the nature of the allyl acetoacetate heated; if, for instance, the allyl acetoacetate is methylbutenyl acetoacetate, it may be heated at a temperature from 110° to 170° C., preferably from 140° to 170° C. The allyl acetoacetate is conveniently heated with the aluminium compound in an apparatus which enables a steady stream of carbon dioxide to be evolved and removed.

The aluminium compound used in the process of the invention may be, for example, an aluminium mono-(acetylacetonate) di-(alkoxide), aluminium di-(acetylacetonate) mono-(alkoxide), aluminium mono-(methylacetoacetate) di-(alkoxide), aluminium di-(methylacetoacetate) mono(alkoxide), aluminium mono-(ethylacetoacetate) di-(alkoxide), aluminium di-(ethylacetoacetate) mono-(alkoxide), aluminium di-(alkoxide) mono-(2:4-pentanedione) or aluminium di-(alkoxide) mono-(ethylmalonate). The alkoxide is preferably a methoxide, ethoxide, propoxide or butoxide. The aluminium compound may, for example, be prepared by reacting the calculated stoichiometric proportions of the corresponding aluminium trialkoxide and acetylacetone or alkyl acetoacetate, removing the alkanol produced and recovering the aluminium compound, or by other known methods.

The following examples further illustrate the invention.

Example 1

Methylbutenyl acetoacetate was heated with aluminium di-(isopropoxide) mono-(ethylacetoacetate) as catalyst in a reactor fitted with a stirrer and a gas outlet, at from 140° to 170° C. so that a steady stream of carbon dioxide was evolved from the pyrolysis of the methylbutenyl acetoacetate, leaving methylheptenone in the reactor. The concentration of catalyst was 16 millimoles per mole of methylbutenyl acetoacetate.

The molar yield of methylheptenone produced based on the methylbutenyl acetoacetate, was 77.5%.

As a comparison, methylbutenyl acetoacetate was heated under the same conditions except that no aluminium compound catalyst was present; the yield of methylheptenone was 66% based on the methyl-butenyl acetoacetate.

Example 2

Methylbutenyl acetoacetate produced from 2,332 parts by weight of crude methylbutenol, containing 2,178 parts by weight of methylbutenol, was mixed with 120 parts by weight of aluminium di-(isopropoxide) mono-(ethylacetoacetate) and the mixture was heated at 170° C. The concentration of catalyst was 16 millimoles per mole of methylbutenyl acetoacetate.

After purifying the product by distillation, 2,521 parts by weight of methylheptenone were obtained, the molar yield, based on the methylbutenol reacted, was 83.8%.

I claim:

1. A process of producing an unsaturated ketone having the formula:

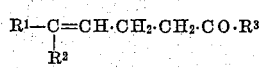

which comprises heating at an elevated temperature in the range of about 100° to 250° C. an allyl acetoacetate having the formula:

in contact with an aluminum compound having the formula $$Al\left[-OC\underset{CH.CO.R^5}{\overset{R^4}{\diagup}}\right]_n\left[-OR^6\right]_{3-n}$$

wherein $R^1$ and $R^2$ are each selected from the group consisting of alkyl groups of 1 to 2 carbon atoms and hydrogen atoms, $R_3$ is an alkyl group of 1 to 2 carbon atoms, $R^4$ and $R^5$ are each selected from the group consisting of alkyl groups of 1 to 2 carbon atoms and alkoxy groups of which the alkyl part has 1 to 2 carbon atoms, $R^6$ is an alkyl group of not more than 5 carbon atoms and $n$ is one of the integers 1 and 2.

2. A process claimed in claim 1 wherein the allyl acetoacetate is methylbutenyl acetoacetate and wherein the acetoacetate is contacted with the aluminium compound at a temperature from 110° to 170° C.

References Cited in the file of this patent
UNITED STATES PATENTS
2,795,617     Kimel et al. _____ June 11, 1957